United States Patent [19]
Gottschalk et al.

[11] Patent Number: 6,007,078
[45] Date of Patent: Dec. 28, 1999

[54] SELF-STEERING, CASTER ADJUSTABLE SUSPENSION SYSTEM

[75] Inventors: Michael J. Gottschalk, Grandville; Michael J. Keeler, Blacklick, both of Ohio

[73] Assignee: The Boler Company., Itasca, Ill.

[21] Appl. No.: 09/052,131

[22] Filed: Mar. 31, 1998

[51] Int. Cl.[6] .................................................. B62D 17/00
[52] U.S. Cl. .................................... 280/86.751; 280/86.5; 280/86.6
[58] Field of Search ...................... 280/81.6, 86.5, 280/86.751, 89.11

[56] References Cited

U.S. PATENT DOCUMENTS

| | | | |
|---|---|---|---|
| 3,510,149 | 5/1970 | Raidel | 280/124 |
| 3,771,812 | 11/1973 | Pierce et al. | 280/124 F |
| 3,861,708 | 1/1975 | Fier | 280/124 F |
| 3,902,734 | 9/1975 | Fier | 280/106 R |
| 3,904,220 | 9/1975 | Fier | 280/124 F |
| 4,770,430 | 9/1988 | Lange | 280/81 A |
| 4,792,148 | 12/1988 | Hintz | 280/81 A |
| 4,881,747 | 11/1989 | Raidel | 280/81.6 |
| 5,015,004 | 5/1991 | Mitchell | 280/81.6 |
| 5,018,756 | 5/1991 | Mitchell | 280/81.6 |
| 5,058,916 | 10/1991 | Hicks | 280/704 |
| 5,220,972 | 6/1993 | Proia | 180/24.01 |
| 5,403,031 | 4/1995 | Gottschalk et al. | 280/704 |
| 5,479,999 | 1/1996 | Proia | 180/24.01 |
| 5,620,194 | 4/1997 | Keeler et al. | 280/81.6 |
| 5,816,605 | 10/1998 | Raidel | 280/81.6 |

OTHER PUBLICATIONS

Ridewell Corp. "Auto–Reversing Kit/Short" Drawing Number AS–7570 C#4 May 14, 1991.

*Primary Examiner*—Paul N. Dickson
*Attorney, Agent, or Firm*—Hall, Priddy & Myers

[57] ABSTRACT

A self-steering axle suspension system of the parallelogram type is provided with a tri-pivot cradle mechanism for changing the caster of the axle to provide for either a reverse or forward steerable axle mode while equalizing the forces on the pivots in the parallelogram to reduce pivot wear out.

19 Claims, 6 Drawing Sheets

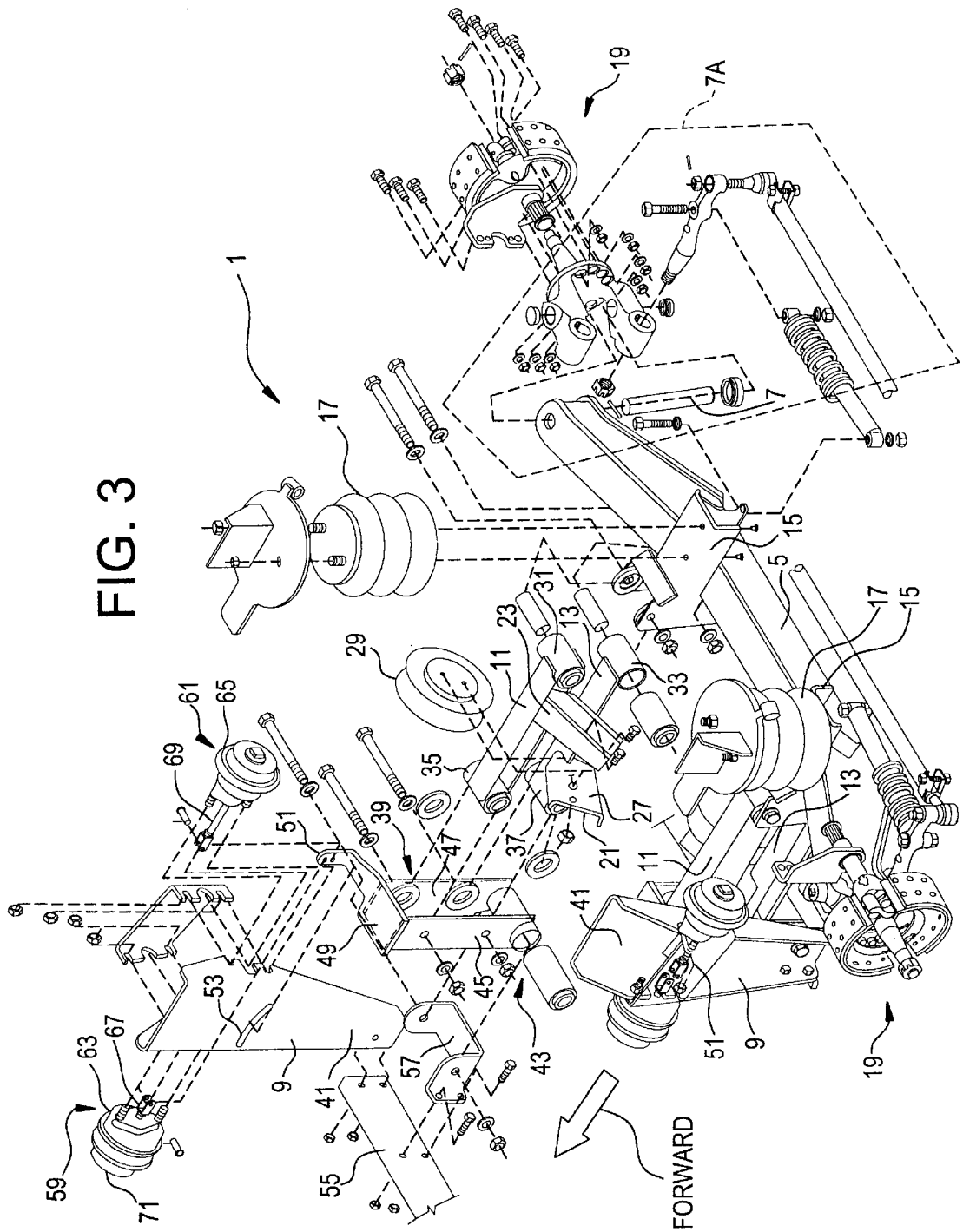

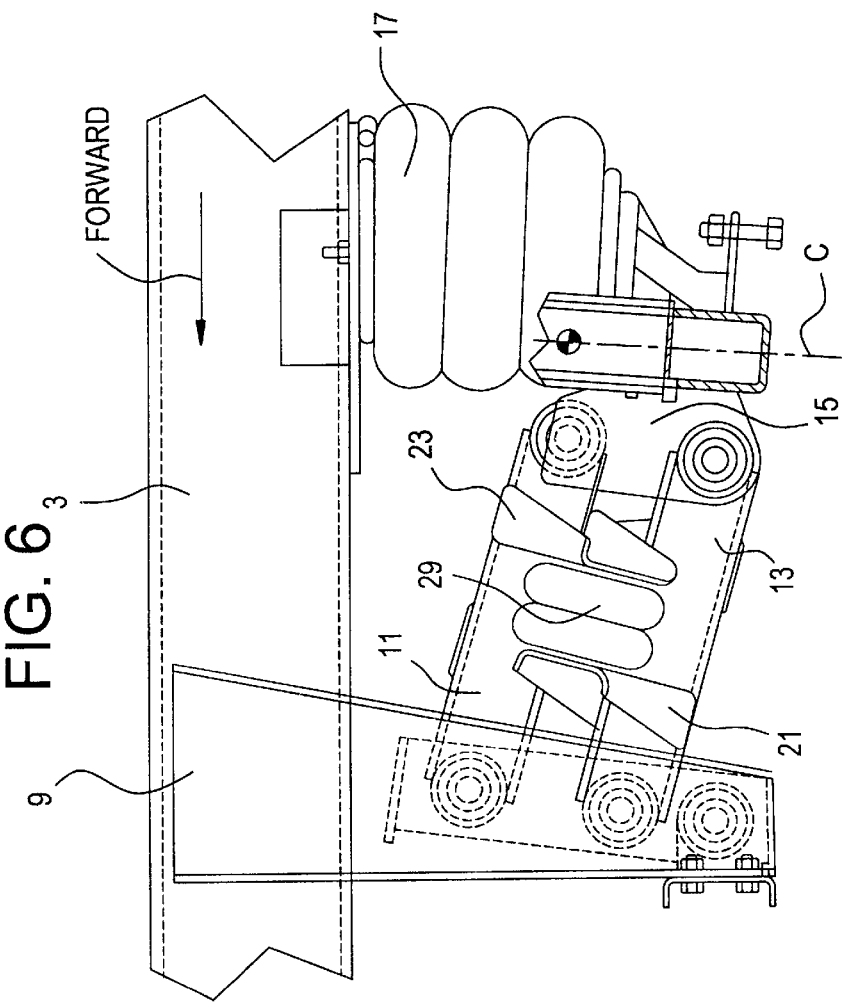

SELF-STEERING, CASTER ADJUSTABLE SUSPENSION SYSTEM

FIELD OF THE INVENTION

This invention relates to axle suspension systems for vehicles. More particularly, this invention relates to such suspension systems which are provided with a mechanism for adjusting the caster of the axle to allow for steerability in either the reverse or forward travel mode.

BACKGROUND OF THE INVENTION

The need for steerable auxiliary axles on various types of vehicles (trucks, trailers, etc.) is well known. By the term "auxiliary" axle, as used herein, is meant an axle which is not the axle primarily used for steering the vehicle. Instead, an "auxiliary" axle is one usually added to the vehicle so as to be either forward or rearward of the primary axles and rearward of the vehicle's primary steering axle (e.g. in a straight truck such as a dump truck, garbage truck, etc.). The purpose of adding such an auxiliary axle to the vehicle is normally to increase the load carrying capacity of the vehicle and/or to satisfy highway weight limit laws. Such auxiliary axles may be of the non-liftable or liftable type as contemplated herein.

To render a wheeled axle bearing suspension system "steerable", the caster angle (from the vertical) of the axle (or as may be used at times synonymously in the art, the caster angle of the wheels) must be appropriately chosen to make the wheels of the suspension steerable. A recognized, but not necessarily required, caster angle (from the vertical) is from about 3° to 5°. Thus a 5° caster angle, for example, may be employed for steerable forward travel, while for reverse travel the caster must then be changed, for example, to a –3° caster angle from the vertical. In short, a caster angle for steerability in one travel mode does not normally render steerable the wheel in the opposite travel mode. A need thus arises in the art to provide a mechanism for adjusting (changing) the caster angle, thereby to allow the axle (e.g. auxiliary steerable axle) to be steered during either the reverse or forward mode of travel.

A few attempts have been made in the past to provide adjustable mechanisms whereby the vehicle (e.g. heavy duty truck or semitrailer) operator could change the caster of his auxiliary axle. Examples include those mechanisms disclosed in U.S. Pat. Nos. 4,770,430; 4,881,747; and 5,015,004. Such mechanisms have characteristically employed air cylinders whose extendable/retractable connecting rod for changing caster must be connected in such a way that they, unfortunately, become substantial load bearing members during normal and abnormal vehicle operation. Moreover, such mechanisms have often been quite complex, and in order to attempt to minimize the load which they must carry due to their design, particularly by the rod when extended, the stroke length of the rod has to be materially lengthened, thus resulting in the need for a large, heavy and expensive air cylinder.

For several years now, the heavy duty trucking art has known of a particularly advantageous type of suspension system known as a "parallelogram" suspension. An excellent and successful example of such a system is found in U.S. Pat. No. 5,403,031. Therein, a unique liftable axle suspension system is disclosed which employs not only a very advantageous form of a parallelogram arrangement, but provides a unique lifting mechanism for selectively raising and lowering the wheels of a vehicle from the road surface (i.e. the ground or other travel surface of the vehicle). This patent also teaches a manual caster adjustment feature for adjusting the caster angle of the axle (wheel) when the need arises.

The unique suspensions of this aforesaid U.S. Pat. No. 5,403,031 (commonly owned and having an overlapping inventorship herewith) constitute a principal background from which this invention arose. As to certain embodiments of this invention, they may be considered specific improvements upon this aforesaid patent in that there is herein provided a unique and effective caster adjusting mechanism which may be used instead of the caster adjustment disclosed in this prior patent, the same basic parallelogram structure being otherwise maintained so as to couple its unique efficacy with that of this invention. For this reason the entire disclosure of U.S. Pat. No. 5,403,031 is incorporated herein by reference.

Given this current state of the art, it is apparent that there exists a need for an axle suspension system, preferably of the advantageous parallelogram type, which has a more effective caster adjusting mechanism associated therewith, which is easily operated, even in a field location, automatically, and which does not create undue loads on the mechanism. It is a purpose of this invention to fulfill this and other needs which will become more apparent to the skilled artisan once given the following disclosure.

SUMMARY OF THE INVENTION

Generally speaking, this invention fulfills the above-described and other needs in the art by providing in a steerable axle suspension system for a wheeled vehicle having a frame member, the suspension system including a wheel bearing axle having at least one ground engaging wheel at each end thereof, the suspension system being attachable to the frame member and, when so attached, defining a caster angle for the axle with respect to the travel surface of the vehicle, the suspension system further including a hanger bracket for connecting the suspension system to the frame member, an air spring, an axle seat for retaining the axle in the system, a first and a second beam member extending between the axle seat and the hanger bracket, and a mechanism for adjusting the caster of the axle, wherein the improvement comprises as the aforesaid adjusting mechanism:

a cradle;

a first pivot attached to the cradle and having an end of the first beam member attached thereto, the other end of the first beam member being pivotally attached to the axle seat;

a second pivot attached to the cradle and having an end of the second beam member attached thereto, the other end of the second beam member being pivotally attached to the axle seat;

a third pivot attached to the cradle and to the hanger bracket such that the cradle is pivotable with respect to the hanger bracket about said third pivot; and wherein the first, second and third pivots are so located, one with respect to the other, such that when the cradle is pivoted about the third pivot with respect to the hanger bracket, the caster angle of the axle is changed.

In further fulfillment of the above-described needs this invention also provides in a unique fashion, a mechanism for adjusting the caster of the axle of at least one axle of a multiaxle, wheeled vehicle, the mechanism comprising:

a hanger bracket;

a cradle assembly;

an axle connection seat;

a first and second beam member, each pivotally connected at one of their ends to the axle connection seat and at their opposite ends to the cradle assembly, thereby to define a first and second pivot in the cradle assembly;

a third pivot located between the hanger bracket and the cradle assembly and pivotally connecting the cradle assembly to the hanger bracket;

the first, second, and third pivots being so located with respect to each other such that when the cradle is pivoted about the third pivot with respect to the hanger bracket, the caster of any wheeled axle connected to the axle connection seat will be changed.

This invention will now be described with respect to certain embodiments thereof as illustrated in the following drawings wherein:

IN THE DRAWINGS

FIG. 3 is a three-dimensional exploded view of the suspension system illustrated in FIGS. 2A, 2B.

FIG. 6 is a side plan X-ray view of a suspension including another embodiment of a mechanism for effecting the change of the caster angle according to this invention.

FIG. 7 is a partially schematized X-ray view of the embodiment of FIG. 6 used to illustrate the dual airbag caster adjustment mechanism illustrated in FIG. 6.

DETAILED DESCRIPTION OF CERTAIN EMBODIMENTS

Figure 1A:
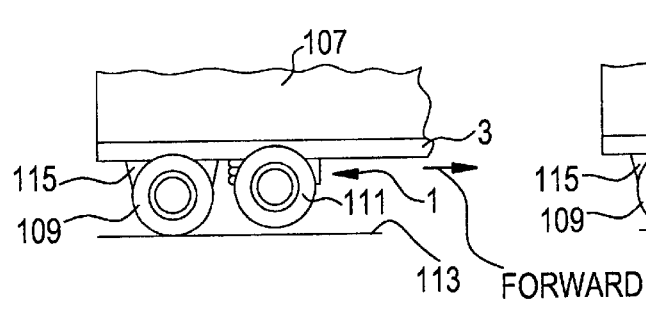
FIG. 1A is a side plan, partial illustration of a vehicle employing an embodiment of a wheeled axle suspension system according to this invention shown in its lifted mode as an auxiliary axle forward of the rearmost axle of the vehicle.
Figure 1B:
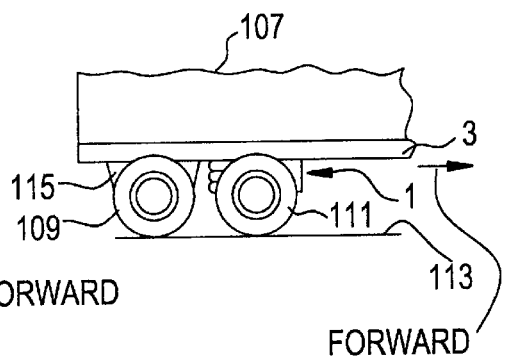
FIG. 1B is the illustration as shown in FIG. 1A with the suspension in its road-engaging mode.

With reference now to FIGS. 1A, 1B, there is illustrated an environment in which this invention finds utility. Therein is illustrated, in partial view, a typical truck (e.g. dump truck, etc.) or semitrailer body 107 having a longitudinal frame member 3 on either side of body 107 (only one side of the vehicle and frame member being shown, the other side being, of course, a duplicate of the side shown).

Rearmost wheels 109 form a primary means of vehicle support via its standard suspension 115 connected to frame members 3 in conventional fashion. Immediately forward of wheels 109 are wheels ill which are selectively raisable and lowerable from and into engagement with travel surface 113 of the vehicle by employing an embodiment of a suspension system 1 as contemplated by this invention. Such a suspension system 1 is often referred to as an auxiliary lift axle suspension system. While, in this respect, a lift axle suspension system is herein illustrated, it is understood that such a feature is optional and that this invention also contemplates non-liftable suspensions which continuously engage the road surface and do not have (by the simple elimination of the associated lift mechanism) this optional feature. Thus, for example, FIG. 1B could just as easily be used to illustrate a non-liftable system 1, as contemplated herein.

Figure 2A:
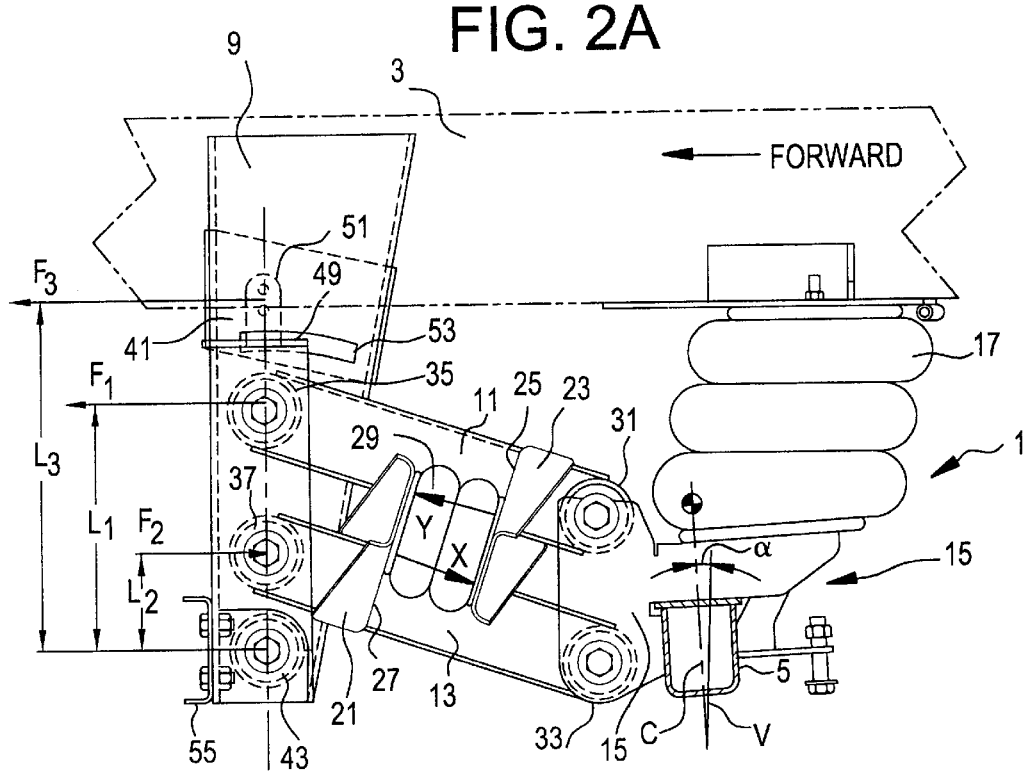
FIG. 2A is a partial side plan view of an embodiment of this invention with the axle caster in a reverse travel mode.
Figure 2B:
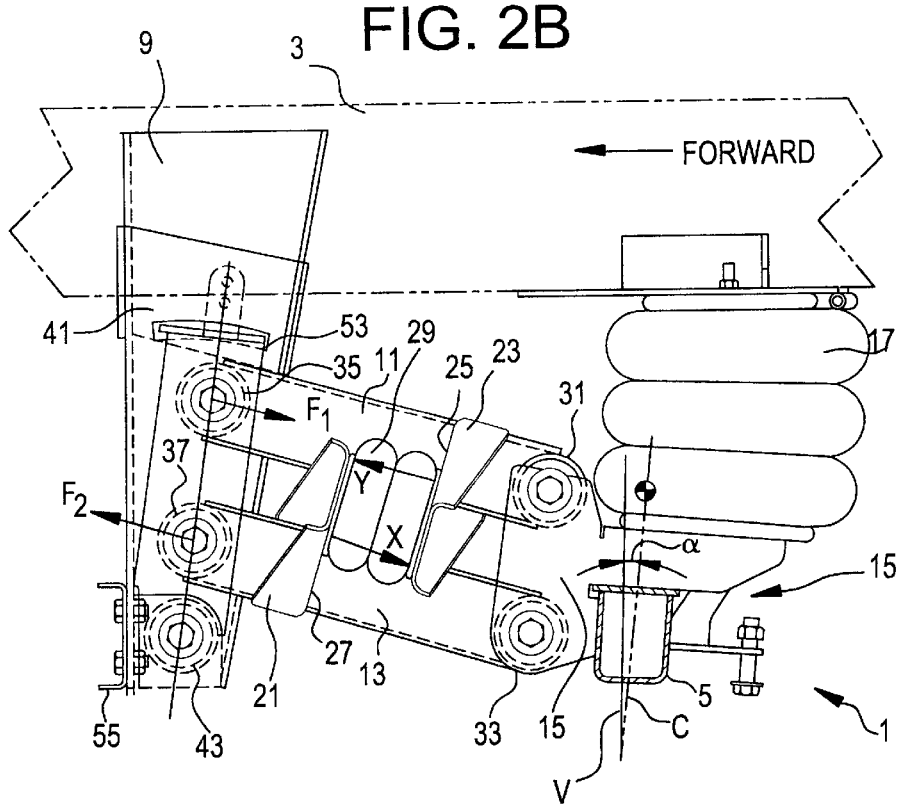
FIG. 2B is the same embodiment as in FIG. 2A, but with the axle caster in a forward travel mode.

Turning now to FIGS. 2A, 2B, there is illustrated an embodiment of this invention in its reverse caster travel mode (FIG. 2A) and forward caster travel mode (FIG. 2B). In this respect, "forward" travel of the vehicle is indicated with an appropriate arrow "Forward" (see also FIG. 3). The opposite direction is, of course, the "reverse" direction of vehicle travel. The caster angle a of axle 5 is the angle formed between the vertical "V" and the center line "C" of axle 5. Conventionally, but not necessarily, the center line of kingpin 7 (FIG. 3) is parallel to center line C. In short, as illustrated, to render auxiliary wheels steerable, in most instances, the caster angle is formed, i.e. the axle is "tilted", so that the bottom of each wheel which is to engage the ground surface 113 "leads" its top corresponding counterpart in the direction of travel. Various angles, positive and negative, may be employed depending upon the vehicle, the type of operation, axle location, etc., and as such are well known to the skilled artisan for his selection. For most purposes contemplated an angle α of about 3° to 5° (forward/reverse) from vertical is usually acceptable, and indeed often optimal. In this respect, the reverse angle need not be, and often is not, the same as the forward angle for a particular vehicle.

As can be seen by comparison, suspension 1 as illustrated is essentially the same advantageous parallelogram auxiliary lift axle suspension as disclosed in aforesaid U.S. Pat. No. 5,403,031, except that the manual caster adjustment mechanism of that patented invention is now replaced by the unique caster adjustment mechanism of this invention which advantageously isolates the caster adjusting mechanism from any substantial harmful load bearing forces experienced during normal and/or abnormal vehicle operation, which forces are then more appropriately taken up (or handled) by other components in the suspension. A preferred embodiment of this unique caster adjusting mechanism is best illustrated in FIGS. 2A and 2B, and particularly in FIG. 3.

As illustrated, suspension 1 includes on each side of the vehicle associated with a respective longitudinal frame member 3, a hanger bracket 9, an upper longitudinal beam member (i.e. control arm) 11, a lower longitudinal beam member (i.e. control arm) 13, an axle seat generally represented at 15 and an airbag 17. Axle 5, of course, extends laterally across the vehicle and includes at either end a conventional wheel assembly with brake pads, etc. as illustrated generally at 19 (FIG. 3). Axle 5, via connection axle seat 15, connects the two sides of suspension system 1 as does "C"t-shaped cross-member 55.

Also extending laterally across the vehicle and coordinating the steerability of each wheel 111, are various conventional interrelated members, all connected in a known fashion to render the axle suspension system 1 steerable through a series of interconnected pins and rods. For convenience this kingpin steerable assembly, being conventional, is indicated generally in the framed in area as item "7A". Such assemblies are well known in the art and their various illustrated parts need not be further detailed here.

Upper and lower beam members 11, 13 are preferably substantially parallel so as to achieve the benefits of a parallelogram axle suspension system. In the same fashion as in U.S. Pat. No. 5,403,031, there may optionally be provided in the suspensions of this invention bi-directional bellows means for raising and lowering the wheels 111 from and into road engagement. As illustrated, bellows means include a pair of appendages 21 and 23 which are connected to and are located between upper beam member 11 and lower beam member 13. As illustrated here, appendage 21 is connected to bottom beam 13, while appendage 23 is connected to top beam 11, both appendages extending inboard of the suspension on both sides of the vehicle. In this arrangement expansion of any airbag located between opposing appendages (as described below) will cause lifting of the axle (as bellows 17 is deflated). On the other hand, inflating bellows 17 and deflating airbag 29 lowers the axle to engage the wheels with the road surface.

The face plates 25, 27 of appendages 21 and 23 extend substantially perpendicular from the beams 11 and 13, and are substantially parallel one with respect to the other. Expandable air bellows (i.e. airbag) 29 is located between face plates 25, 27 (FIG. 3), and through the parallelogram arrangement of the parts herein, expand in a truly "bi-directional" manner (i.e. expands or contracts in a substantially linear direction, thus dividing the lifting and lowering forces of bellows 29 between upper and lower beam members 11 and 13, respectively, as more fully described in the aforesaid '031 patent). FIG. 3, in exploded view, shows the actual air bellows 29, while, for illustration purposes, FIGS. 2A, 2B also illustrate the bi-directional nature of the movement of air bellows 29 by force arrows x, y.

Maintaining the parallelogram nature of system 1 are four pivots of conventional type (elastomeric bushing pivots) connecting each end of beams 11 and 13 to hanger bracket 9 and axle seat 15, respectively. Pivots 31 and 33 are the axle seat pivots, while pivots 35 and 37 are the hanger bracket pivots. Preferably the distance between pivots 31 and 33 is the same as the distance between pivots 35 and 37, thereby to maintain the true parallelogram nature of the suspension.

Air bellows 17 are connected at their top end to their respective frame members 3 and at their bottom end to axle seat 15 in conventional fashion. In this way, and in a known manner, these air bellows are the primary means for taking up (i.e. handling) the articulation and load-carrying forces of the suspension (and thus the vehicle) experienced during vehicle operation over the road surface. Some of these forces, however (e.g. braking forces), must also be taken up in pivots 31, 33, 35 and 37, and thus these four pivots are sized accordingly, in a known way, to account for these forces.

As described above and to this point, auxiliary axle suspension system 1 is of well known construction, both through successful use in industry and as disclosed in the aforesaid U.S. Pat. No. 5,403,031. However, now, in accordance with this invention, a unique caster adjusting mechanism is provided in place of the manual mechanism described and illustrated in this aforesaid patent. As herein illustrated in FIGS. 2–4, a mechanism for adjusting caster is uniquely provided in association with hanger brackets 9, rather than in one of the pivots between a beam member and axle seat as in the aforesaid patent.

More specifically, the unique caster adjusting mechanism illustrated herein includes, with respect to each side of the vehicle (and hanger bracket), a cradle 39 pivotally connected to vertical side plate 41 of hanger bracket 9 by pivot 43. Pivot 43 is of the same type as pivots 35 and 37, and allows cradle 39 to be pivoted with respect to stationary hanger bracket 9. Differing further from the aforesaid U.S. Pat. No. 5,403,031 (wherein pivots 35 and 37 are connected to hanger bracket 9), is the fact that in this invention pivots 35 and 37 are independent of hanger bracket 9. As can be seen, cradle 39 includes a pair of opposing vertical side plates 45, 47. Pivots 35 and 37 extend between plates 45 and 47 and are pivotally connected thereto rather than to hanger bracket plate 41. Cradle 39 then further includes a top flange 49 extending across and connecting plates 45 and 47, but having an arm 51 extending outwardly therefrom and through a guide slot 53 in plate 41 of hanger bracket 9. Bottom plate 57 may be provided to strengthen the assembly, but, as illustrated, must not interfere with the ability of cradle 39 to be pivoted about pivot 43 with respect to hanger bracket 9.

As can now be seen, and as described more fully below, if cradle 39 is pivoted about pivot 43 in either direction, the parallelogram pivots 35 and 37 also simultaneously move with respect to pivot 43. Since pivots 31 and 33 are connected to stationary axle seat 15, to which axle 5 is connected, the caster angle $\alpha$ of axle 5 (and thus the steerability of wheels 111) is changed in this embodiment by movement of arm 51, while the essential benefits of a parallelogram suspension are maintained. As illustrated in FIG. 2A, by moving arm 51 in the forward direction proximal one end of slot 53, a negative caster angle $\alpha$ of –5° or, in certain embodiments, –3° is achieved in axle 5 for reverse steerable travel. In FIG. 2B arm 51 is moved rearward proximal the opposite end of slot 53, thus achieving a positive caster angle $\alpha$ of 5° in axle 5 for forward steerable travel. The angles of caster, size of slot 53, etc. may be chosen and varied as the application dictates and need not be ±3° or ±5°, which are simply preferred representative angles $\alpha$ found useful in many trucking environments both on and off road.

In a particularly preferred embodiment of this invention, pivot 43 is rendered substantially without torsional moment under both normal and abnormal operation. By "without torsional moment", as used herein, is meant that pivot 43 is effectively isolated from torsional forces, such as braking forces and the like. These forces are illustrated in FIGS. 2A, 2B by resultant vector force arrows $F_1$ and $F_2$. As illustrated, pivots 35, 37 and 43 are substantially vertically spaced one from the other, such that there is a distance $L_1$ separating pivot 35 from pivot 43 and a distance $L_2$ separating pivot 37 from pivot 43. The resultant force, due to operational articulation of pivot 35, e.g. as would occur during vehicle braking, is the quantity $L_1F_1$ and the quantity $L_2F_2$ for pivot 37. $F_2$ and $F_1$ are not of the same magnitude and are reasonably calculable for most general purposes. They act in the opposite direction due to the generally parallelogram nature of the suspension. Thus by making the quantity $L_1F_1$ substantially equal in magnitude to its opposite acting quantity $L_2F_2$ through selection of the appropriate lengths $L_1$ and $L_2$, the net torsional force on pivot 43 (and any mechanism attached to arm 51 to move it) is minimized or rendered, ideally, substantially zero. Moreover, the torsional force $F_3$ at lever arm length $L_3$ is advantageously also minimized.

A typical set of parameters for use on suspensions finding particular utility in conventional semitrailers is for $L_1$ to be 11.5 inches, while $L_2$ is 4.0 inches, and $L_3$ is 14.5 inches, wherein $F_1$ is about 2100 lbs., $F_2$ is about 5200 lbs., and $F_3$ is, in effect, then, the force of the brake chamber. In such a suspension it has been found that forces in pivot 43 are at least minimized in most applications and that not only is pivot 43 longer lasting, but that the mechanism (hereinafter described) for moving arm 51 in slot 53 is substantially isolated (protected) from undue operational (torsional) forces experienced during vehicle use, and need not be overly designed.

Figure 4A:
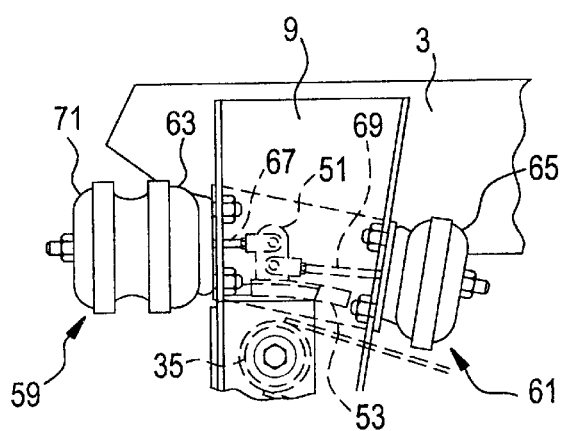
FIGS. 4A, 4B are partial side plan, X-ray views of one embodiment of a mechanism for effecting the change of the caster angle.
Figure 4B:
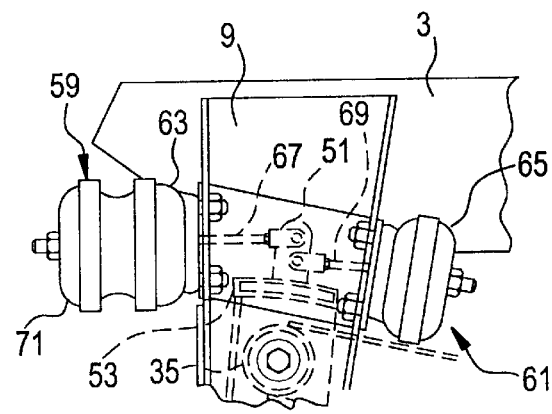

Turning now to two, different embodiments of a mechanism for pivoting cradle 39 about pivot 43, thereby to change caster angle $\alpha$, attention is first directed to FIG. 3, and more particularly, to FIGS. 4A,B. It is understood, in this respect, that any of a number of mechanisms may be employed, such as a simple, manually operated, lever rod conveniently located for use by the operator, and securable to be sure the caster angle is "locked" in place once selected. Other possible mechanisms include air or hydraulically operated piston assemblies, an opposing airbag (described below with respect to FIGS. 6–8), or electronic solenoids, all having "locking" means to insure maintenance of angle $\alpha$ once selected. Turning now, however, to FIGS. 3 and 4A,B, the mechanism therein includes a pair of opposing air brake chamber assemblies 59, 61 of known type (e.g. 24" MGM air brake chambers) having an air brake chamber 63,65 and reciprocal rods 67, 69, respectively.

Preferably one or the other of cylinders 59 or 61 is provided with an additional parking spring brake chamber 71 (here attached to chamber 63) which, in conventional manner, upon loss of air pressure causes the large parking brake spring (not shown) to automatically extend the rod to which it is attached, to lock the caster in a specific mode. Here, in preferred form, spring brake chamber 71, attached to air chamber 63 will, upon loss of air in the system, cause rod 67 to extend, quickly shifting the caster $\alpha$ to a "forward" steerable travel mode.

In either event, respective air brake chamber assemblies 59 and 61 provide two important functions. By extending one rod and retracting the opposite rod (and by adjusting the length of the rods accordingly) a full range of movement from a positive (forward steerable) to a negative (rearward steerable) caster angle $\alpha$ can be achieved. In addition, by using opposing chambers in this way, the desired caster angle, once achieved, is effectively "locked" in place by these opposing assemblies 59 and 61. In this respect, and with reference to FIGS. 4A, 4B, it can be seen that when rod 67 is retracted and rod 69 extended, cradle 39 pivots about pivot 43 causing caster angle $\alpha$ to be in the "reverse" travel mode for steerability, while the opposite operation (FIG. 4B) causes caster angle $\alpha$ to assume its "forward" travel mode for steerability. In both modes, caster angle $\alpha$ is "locked" in place by the opposing brake chambers.

Moreover, when the above-described lift option is provided through the use of air bellows 29, these bellows, if maintained in slightly expanded form or via their internal, conventional bumpers (not shown), even when the wheels 111 are fully lowered into road engagement, will further serve to "cushion" any forces experienced at rod 67. A further air bellows (not shown) may be provided on the side of each beam 11 opposite that of bellows 29 and acting in opposite direction, if desired, to "cushion" or further "cushion" any forces on rod 69. As can be seen, the mechanism employed to pivot cradle 39 (arm 51) sees a substantially reduced amount (and preferably, substantially a zero amount) of braking or other operationally induced forces due to the nature of the triple pivot arrangement, in which $L_1F_1$ is made to be equal to or to approximate $L_2F_2$. This enables the use of conveniently sized mechanisms whose rods, pistons or chambers do not have to be oversized and complex, to effectively shift the saddle by applying a force $F_3$ at the end of lever arm length $L_3$ (i.e. at 51).

Figure 5:
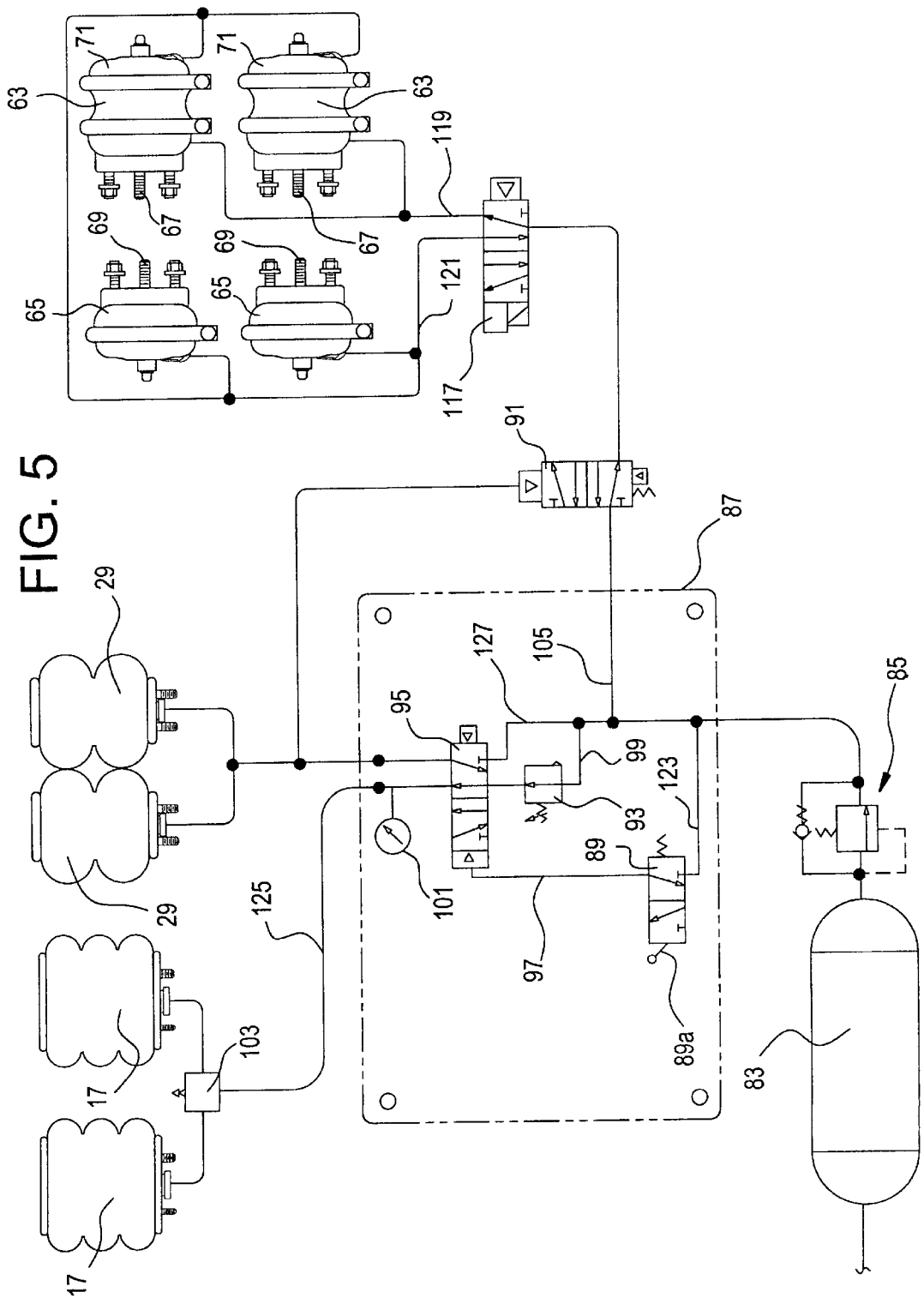
FIG. 5 is a schematic diagram of the operating controls for raising or lowering the axle suspension illustrated in FIGS. 1–3 and/or adjusting the caster of the wheel bearing axle via the mechanism of FIGS. 4A, 4B.

Turning now to FIG. 5, an embodiment of the operating controls for adjusting the caster of the embodiment in FIG. 3 is schematically illustrated. As such, they may also be used to raise and lower the axle. For example, as shown, air delivered to the system via air supply reservoir 83 (e.g. the air reservoir for the air brakes if such is employed on the vehicle) passes through a pressure protection valve 85 before reaching the system's control panel 87. At panel 87, flow is directed to a two-position toggle valve 89, a spring return pilot valve 91, a pressure regulator 93 and an air pilot valve 95. Vertical axle position (i.e. lifting and lowering) is controlled by toggle valve 89 which may be conveniently located in the cab of the vehicle within easy reach of the operator.

With toggle valve 89 shifted via handle 89*a* into its "down" or "ride" position, as shown in FIG. 5, no air signal passes through line 97 to activate pilot valve 95. In this state, air from line 99 enters pressure regulator 93 which thereby controls the flow of air through pilot valve 95, pressure gauge 101, quick release valve 103, and to auxiliary axle ride springs 17. Suspension air capacity is conventionally determined based upon ride spring pressure, shown by pressure gauge 101, and is adjusted with pressure regulator 93. Typical pressures employed are 80–90 psi.

During operation of a loaded vehicle with the auxiliary axle in the "down" position and wheels 111 engaging the road surface, caster angle $\alpha$ is adjusted to correspond with either the forward or reverse direction of intended vehicle travel. This is accomplished by actuating the two service brake chambers 65 and the two spring brake chambers 63/71 which are plumbed independent of the vehicle's braking system. Here, air is supplied to the caster adjusting portion of the control system via line 105, and passes through pilot valve 91 which is normally open when the auxiliary axle is in the "down" position. Supply of air is thus directed to either the two service brake chambers 65 and the safety chamber portions 71 of the two spring brake chambers 63 thereby extending rods 69 (and retracting rods 67) to create a negative axle caster for reverse travel, or, in the opposite mode, to the service sides of the two spring brake chambers 63 (rods 69 retracting, rods 67 extending) to create a positive axle caster for forward travel. Flow direction is selected (controlled) by operation of 4-way solenoid valve 117 actuated via an electronic input in a conventional fashion from the vehicle's "reverse" light system (not shown) or any other equivalent source.

In the normally open position as shown (i.e. with no input signal from the vehicle), flow is directed to line 119 and exhausted from line 121 for forward vehicle travel (i.e. "positive" caster). Exhausting line 121 disengages the service brakes and activates the safety chamber portions 71 of the two spring brake chambers 63. Additional input force to maintain ("lock" in) positive caster is provided by the spring brake chambers due to the full line pressure supplied to the service portions of these chambers. With an input signal from the vehicle indicating reverse travel, air flow is redirected by solenoid valve 117 to line 121 and exhausted from line 119. This releases spring brake chambers 63 and activates the service brake chambers 65, changing the axle caster angle $\alpha$ from a "positive" forward steerable mode to a "negative" reverse steerable mode.

Repositioning toggle valve 89 (via handle 89*a*) by the vehicle operator to the "up" position, initiates and maintains the wheels in their "lifted" or nonroad engaging position. In this "up" position, toggle valve 89 passes an air signal from line 123 to line 97 activating pilot valve 95. Pilot valve 95, in turn, responds by exhausting air pressure from line 125, and by directing full line pressure from line 127 to lift airbags (springs) 29 and to the pilot port of pilot valve 91. Evacuation of air from line 125 causes quick release valve 103 to exhaust pressure from airbags (springs) 17. With airbags 17 exhausted and lift airbags 29 at full line pressure, pilot valve 91 then stops flow from line 105 and exhausts either line 119 or line 121, whichever line is pressurized by solenoid valve 117. The line not pressurized by solenoid 117 is exhausted via solenoid valve 117. If both lines 119 and 121 exhaust (e.g. as by failure of the air system), safety chambers 71 of spring brake chambers 63 activate, creating a positive axle caster (and maintaining it) for forward steerable travel, regardless of solenoid valve 117's actuation, when the wheels are in the lifted position. On the other hand, if the wheels were in their road-engaging or "down" position when a loss of air pressure occurred, check valve 103 maintains air pressure in airbags 17, while lift bags 29 would be exhausted of air thus maintaining road engagement. In addition, spring brake chambers 71 would be activated extending rods 67 to automatically secure the wheels in a "forward" steerable caster angle α.

Figure 8:
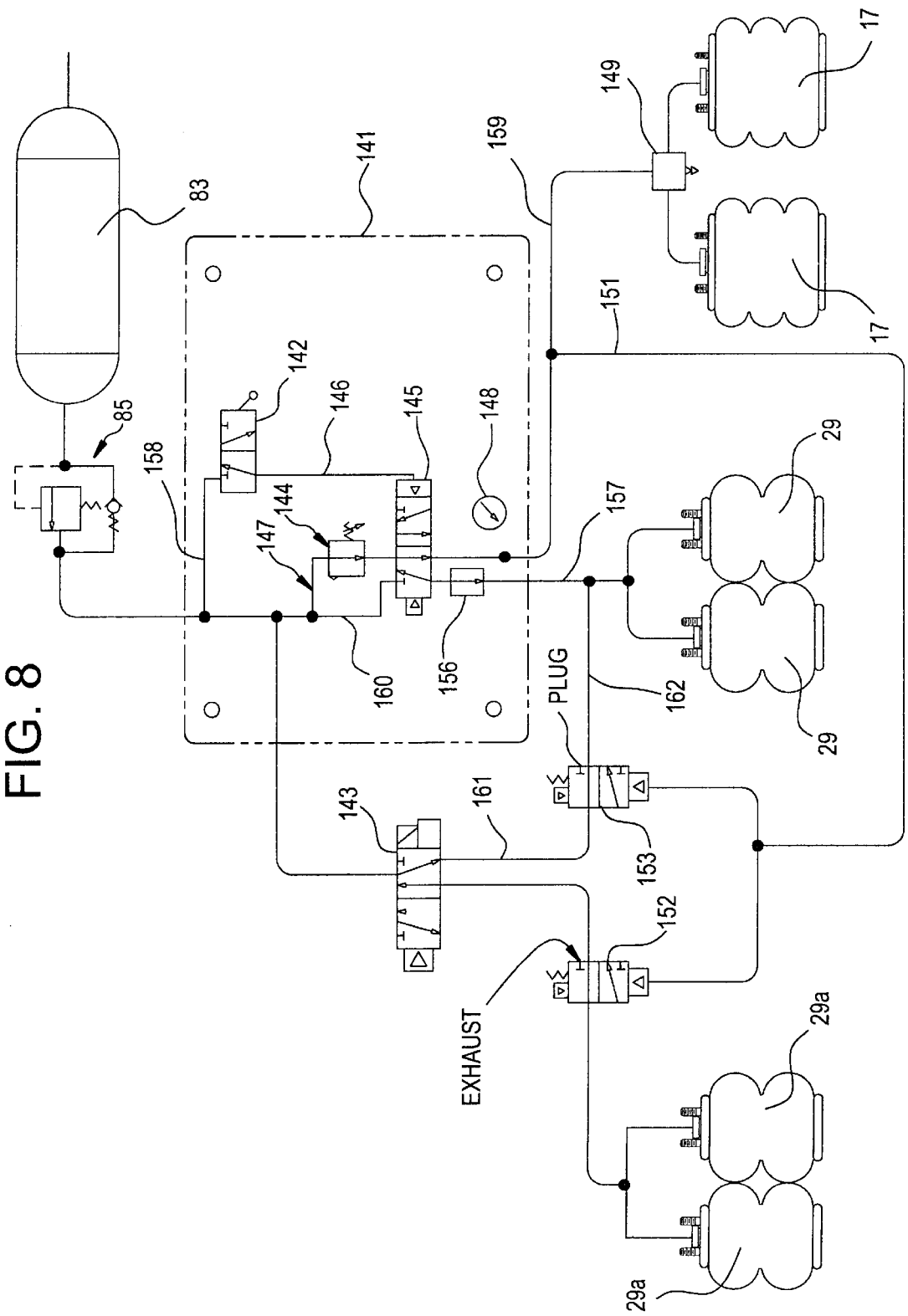
FIG. 8 is a schematic diagram of the operating controls for raising or lowering the axle suspension illustrated in FIGS. 6 and 7.

With reference now to FIGS. 6–8, there is illustrated another advantageous mechanism for pivoting cradle 39 about pivot 43 to thereby change axle caster angle α. In this respect, FIG. 6 illustrates cradle 39 pivoted rearwardly thereby to create a "forward" travel, steerable caster angle similar to FIG. 2B. It is understood that in the embodiment of FIG. 6 if cradle 39 is pivoted forwardly to the position as shown in FIG. 2A, a "reverse" travel mode caster angle (as shown in FIG. 2A) is achieved.

In this embodiment of FIG. 6, the adjusting brake chamber mechanism is replaced by simply providing another expandable air bellows 29a on the outboard side of parallelogram beam members 11 and 13 on both sides of the vehicle and, of course, reversing the position (i.e. beam to which they are connected) of appendages 21a and 23a with respect to their corresponding inboard appendages 21 and 23, respectively. FIG. 7 is presented in schematized form, leaving out various other elements shown in FIG. 6, so as to better illustrate that if inboard appendage 23 is attached to top beam 11, while inboard appendage 21 is attached to bottom beam 13, then outboard appendage 23a is attached to bottom beam 13 and outboard appendage 21a is attached to the top beam. (Of course, the inboard and outboard positions may be reversed, if desired, such that the inboard and outboard bellows 29, 29a will assume the opposite function from that as immediately described below.)

As can be seen, an effective mechanism for changing and "locking in" a chosen caster angle is presented by this inboard/outboard airbag arrangement. In the illustrated embodiment, inboard air bellows 29, when expanded, will still raise the axle 5 (and thus the wheels from the road surface) if bellows 17 and 29a are deflated. If, however, air bellows 17 are maintained inflated and the wheels are in road engagement, expansion (i.e. activation) of inboard bellows 29 (in the illustrated position of appendages 23 and 21 of FIGS. 6–7) and deflation of outboard bellows 29a will not lift the axle (due to air bellows 17 being inflated), but, rather, will change the caster angle α to the "forward" travel mode. Then, of course, the opposite is also true. If air bellows 17 are again maintained inflated and the wheels are in road engagement, expansion (activation) of outboard bellows 29a with deflation of inboard bellows 29 will change the caster angle α to the "reverse" travel mode.

FIG. 8 illustrates an embodiment of controls useful for operating the suspension of FIGS. 6–7, both with respect to raising and lowering of the wheels (axle) from and into road engagement and to change caster angle α.

The air control system for the Reverse Caster Suspension (HLUR) automatically adjusts the auxiliary axle's caster and allows the vehicle operator to control the adjustment of suspension capacity and vertical axle position.

Air delivered to the system via a supply reservoir 83 passes through a pressure protection valve 85 before reaching the system's control panel 141. At the panel, flow is directed to a two-position toggle valve 142, a 4-way solenoid valve 143, a pressure regulator 144, and an air pilot valve 145. Vertical axle position is controlled via the toggle valve.

With the toggle valve in the "Down" or "Ride" position as shown in FIG. 1, no air signal passes through line 146 to activate pilot valve 145. In this state, air from line 147 enters the pressure regulator controlling the flow through pilot valve 145, the pressure gauge 148, the quick release valve 149, and to the auxiliary axle's ride springs 17. Flow through pilot valve 145 and pressure regulator 148 also provides the pilot signal in line 151 to the normally closed spring return pilot valves 152 and 153. Suspension capacity is determined based on ride spring pressure shown by the pressure gauge, and is adjusted with the regulator.

During operation of the loaded vehicle (auxiliary axle in down position), caster of the auxiliary axle will change corresponding to the forward and reverse direction of vehicle travel. Caster change is controlled by two sets of two air springs attached to the suspension's trailing arm beams. Air springs 29 mounted on the inboard sides of said beams, when activated, induce a positive castering of the auxiliary axle. Negative caster is achieved by deactivating air springs 29, and activating air springs 29a mounted on the outboard sides of the trailing arm beams.

With the auxiliary axle down and suspension set for forward vehicle travel, a pilot signal from line 151 opens the normally closed valves 152 and 153 as shown in FIG. 8. Supply to these pilot valves is controlled by the 4-way solenoid valve 143 actuated via an electronic input from the vehicle's reverse lights or an equivalent source. In the normally open position shown (with no input signal from the vehicle), valve 143 directs flow to valve 153 which provides pressure to air springs 29. Check valve 156 prevents the exhaust of flow from line 157 through pilot valve 145. Air from ride springs 155 passes through valves 152 and is exhausted by valve 143. With an input signal from the vehicle indicating reverse travel, flow is redirected by solenoid valve 143 to valve 152 which supplies full line pressure to air springs 29a. Pressure from air springs 29 is exhausted by valve 143. Activation of the outboard mounted air springs 29a and deactivation of air springs 29 changes the axle's caster angle from positive to negative permitting reverse vehicle travel.

Repositioning of the toggle valve switch 142 by the vehicle operator to the "Up" position initiates and maintains auxiliary axle lift. In the up position, the toggle valve passes an air signal from line 158 to line 146 activating the pilot valve 145. The pilot valve responds by exhausting all air pressure from lines 151 and 159, and by directing full line pressure from line 160 through check valve 156 and to air springs 29. Evacuation of air from line 159 causes the quick release valve 149 to exhaust all pressure from the ride springs 17. With air pressure exhausted from line 151, pilot valves 152 and 153 return to a normally closed position. Valve 152 in normal position evacuates any existing pressure through its exhaust port from air springs 29a. Its exhaust port plugged, valve 153 in normal position prevents flow from passing between lines 161 and 162. This ensures that no air from line 157 will be exhausted through pilot valve 153. With the ride springs 17 exhausted and air springs 29 actuated, the air springs maintain auxiliary axle lift as well as positive axle caster regardless of the electronic input signal to solenoid valve 143.

As can be seen, an effective, noncomplex and lightweight, automatic caster adjusting mechanism in both of the above embodiments is efficiently and effectively provided, allowing a full range of caster angle adjustment while minimizing the loads experienced by the mechanism itself.

Once given the above disclosure many other features, modifications and improvements will become apparent to the skilled artisan. Such other features, modifications and improvements are therefore considered to be a part of this invention, the scope of which is to be determined by the following claims:

We claim:

1. In a steerable axle suspension system for a wheeled vehicle having a frame member, said suspension system including a wheel bearing axle having at least one ground engaging wheel at each end thereof, said suspension system being attachable to said frame member and when so attached defining a caster angle for said axle with respect to the travel surface of said vehicle, said suspension system further including a hanger bracket for connecting said suspension system to said frame member, an air spring, an axle seat for retaining said axle in said system, a first and a second beam member extending between said axle seat and said hanger bracket, and a mechanism for adjusting the caster of said axle, the improvement comprising as said adjusting mechanism:

a cradle;

a first pivot attached to said cradle and having an end of said first beam member attached thereto, the other end of said first beam member being pivotally attached to said axle seat;

a second pivot attached to said cradle and having an end of said second beam member attached thereto, the other end of said second beam member being pivotally attached to said axle seat;

a third pivot attached to said cradle and to said hanger bracket such that said cradle is pivotable with respect to said hanger bracket about said third pivot; and wherein said first, second and third pivots are so located one with respect to the other such that when said cradle is pivoted about said third pivot with respect to said hanger bracket, the caster angle of said axle is changed.

2. A steerable axle suspension system according to claim 1 which further includes means for pivoting said cradle about said third pivot.

3. A steerable axle suspension system according to claim 1 wherein said first pivot is located from said third pivot a distance $L_1$ and said second pivot is located from said third pivot a distance $L_2$, and wherein during vehicle operation there is placed upon said first pivot a force $F_1$ and upon said second pivot a force $F_2$, and wherein $L_1$ and $L_2$ are selected such that $F_1 L_1$ is substantially equal to $F_2 L_2$.

4. A steerable axle suspension system according to claim 3 wherein said distance $L_1$ is greater than said distance $L_2$, said three pivots are in substantial vertical alignment one with respect to the other, wherein said third pivot is substantially without torsional moment and is connected to said cradle at a location proximal one end of said cradle, and wherein said cradle is movably attached to said hanger bracket at a location proximal an opposite end.

5. A steerable axle suspension system according to claim 4 wherein said cradle comprises a pair of upstanding, opposing plate members to which said pivots are attached, at least one of said plates having attached thereto a lateral protrusion; said hanger bracket including a guide slot therein into which said lateral protrusion extends, said guide slot being of a sufficient length and width to operatively guide said cradle through a sufficient range of angles when pivoted about said third pivot to adjust the caster of said axle so as to be steerable whether in a forward or a reverse mode.

6. A steerable axle suspension system according to claim 5 wherein said caster adjusting mechanism further includes control means for pivoting said cradle about said third pivot a sufficient distance so as to adjust the caster of said axle a sufficient amount such that said wheel is capable of being steerable in the reverse and forward mode of vehicle travel when said suspension is attached to said vehicle.

7. A steerable axle suspension system according to claim 1 wherein said steerable axle suspension system is a liftable axle suspension system which further includes means for raising and lowering said wheels from and into travel surface of said vehicle.

8. A steerable axle suspension system according to claims 1 or 6 wherein said adjusting mechanism further includes a pair of opposing air brake chambers each including therein an extendable and retractable rod connected at one end to said cradle and actuated by pressurizing air in one of said pair of air brake chambers and simultaneously exhausting air from the other of said pair of air brake chambers.

9. A steerable axle suspension system according to claim 8 wherein one of said opposing air brake chambers further includes means for biasing said caster angle to a forward steerable mode upon the failure of air pressure in the said mechanism.

10. A steerable axle suspension system according to claim 2 wherein said means for pivoting said cradle about said third pivot includes a pair of air bellows so located that when one of said bellows is expanded and the other deflated said cradle is caused to pivot about said third pivot.

11. In a wheeled vehicle having a pair of longitudinally extending frame members and at least two axles having a ground engaging wheel at each end thereof, each said axle being connected to a respective frame member by a suspension system connected to said axle, and wherein one of said axles is a rear axle of said vehicle, and another of said axles is a steerable axle, said suspension system connecting said steerable axle to said frame members and including a mechanism for adjusting the caster of said steerable axle, the improvement comprising as said suspension system connecting said steerable axle to the said longitudinally extending frame members, the steerable axle suspension system according to claim 1.

12. In a wheeled vehicle having a pair of longitudinally extending frame members and at least two axles each having a ground engaging wheel at each end thereof, each said axle being connected to a respective frame member by a respective suspension system connected to said axle, and wherein at least one of said axles is a steerable axle and said axle suspension system connected thereto includes a mechanism for adjusting the caster of said steerable axle, the improvement comprising as the steerable axle suspension system, the steerable axle suspension system according to claim 3.

13. In a wheeled vehicle according to claim 12 wherein said distance $L_1$ is greater than said distance $L_2$, said three pivots are in substantial vertical alignment one with the other, said third pivot is substantially without torsional moment and is connected to said cradle at a location proximal one end of said cradle, and wherein said cradle is movably attached to said hanger bracket at a location proximal its other end.

14. In a wheeled vehicle according to claim 13 wherein said steerable axle suspension system further includes control means for pivoting said cradle about said third pivot a sufficient distance so as to adjust the caster of said axle connected to said steerable axle suspension system a sufficient amount such that said wheels are capable of being made steerable in the reverse and forward modes of vehicle travel when said suspension is attached to said vehicle.

15. In a wheeled vehicle according to claim 14 wherein said steerable axle suspension system is a lift axle suspension system and further includes means for raising and lowering said wheels with respect to the travel surface of said vehicle.

16. A mechanism for adjusting the caster of the wheels of at least one axle of a multiaxle, wheeled vehicle, said mechanism comprising:

a hanger bracket;

a cradle assembly;

an axle connection seat;

a first and second beam member, each pivotally connected at one of their ends to said axle connection seat and at their opposite ends to said cradle assembly, thereby to define a first and second pivot in said cradle assembly;

a third pivot substantially without torsional moment located between said hanger bracket and said cradle assembly and pivotally connecting said cradle assembly to said hanger bracket;

said first, second, and third pivots being so located with respect to each other such that when said cradle is pivoted about said third pivot with respect to said hanger bracket the caster of any wheeled axle connected to said axle connection seat will change.

17. A mechanism for adjusting the caster of the wheels of at least one axle of a multiaxle, wheeled vehicle according to claim 16 wherein said mechanism further includes means for pivoting said cradle about said third pivot with respect to said hanger bracket.

18. A mechanism according to claim 17 which further includes means for raising and lowering the wheels of said axle with respect to the travel surface upon which the vehicle resides.

19. A mechanism according to claim 17 wherein said cradle assembly further includes a pair of vertically extending opposing plate members to which said pivots are attached and a laterally extending guide means, said hanger bracket having a guide slot therein, into which said guide means extends and within which said guide means slides when said cradle is pivoted about said third pivot with respect to said hanger bracket.

* * * * *

UNITED STATES PATENT AND TRADEMARK OFFICE
CERTIFICATE OF CORRECTION

PATENT NO. : 6,007,078
DATED : Dec. 28, 1999
INVENTOR(S) : Michael J. Gottschalk and Michael J. Keeler It is certified that error appears in the above-identified patent and that said Letters Patent is hereby corrected as shown below:

Column 3, line 64, delete "ill" after "wheels" and substitute --111--.

Column 4, line 58, delete ""C"t-shaped" after "does" and substitute --"C"-shaped--.

Signed and Sealed this

Eighth Day of August, 2000

Attest:

Q. TODD DICKINSON

Attesting Officer

Director of Patents and Trademarks